United States Patent [19]
Tanaka et al.

[11] Patent Number: 5,066,965
[45] Date of Patent: Nov. 19, 1991

[54] WATERPROOF AND/OR WATER-RESISTANT CAMERA

[75] Inventors: Hitoshi Tanaka; Kosei Kosako, both of Tokyo, Japan

[73] Assignee: Asahi Kogaku Kogyo Kabushiki Kaisha, Tokyo, Japan

[21] Appl. No.: 581,363

[22] Filed: Sep. 12, 1990

[30] Foreign Application Priority Data

Feb. 6, 1990 [JP] Japan .................. 2-10650[U]
Feb. 6, 1990 [JP] Japan .................. 2-26739

[51] Int. Cl.⁵ .............................................. G03B 17/08
[52] U.S. Cl. .................................................... 354/64
[58] Field of Search ........................................ 354/64

[56] References Cited

U.S. PATENT DOCUMENTS

| | | | |
|---|---|---|---|
| 3,819,254 | 6/1974 | Hummel et al. | 350/255 |
| 4,244,591 | 1/1981 | Umetsu | 354/64 X |
| 4,281,837 | 8/1981 | Hashimoto | 354/64 X |
| 4,763,145 | 8/1988 | Takamura et al. | 354/64 |
| 4,963,902 | 10/1990 | Fukahori | 354/64 |

FOREIGN PATENT DOCUMENTS

| | | |
|---|---|---|
| 58-178126 | 11/1983 | Japan . |
| 62-246027 | 10/1987 | Japan . |
| 62-246028 | 10/1987 | Japan . |
| 63-113137 | 7/1988 | Japan . |
| 1086602 | 10/1967 | United Kingdom . |

*Primary Examiner*—Michael L. Gellner
*Attorney, Agent, or Firm*—Sandler, Greenblum & Bernstein

[57] ABSTRACT

A waterproof and/or water-resistant camera including an opening in which a photographing lens barrel is movable in an optical axis direction, and an annular seal member which is positioned between the photographing lens barrel and the opening, wherein the annular seal member is provided, on its outer periphery, with a secured portion to be secured to the inner portion of the opening and is provide, on its inner periphery, with a lip portion which elastically comes into close contact with the outer periphery of the photographing lens and which is elastically deformable independently for the secured portion.

14 Claims, 8 Drawing Sheets

WATERPROOF AND/OR WATER-RESISTANT CAMERA

BACKGROUND OF THE INVENTION

1. Field of the Invention

The present invention relates to a waterproof and/or water-resistant camera, more precisely, it relates to a waterproof and/or water-resistant camera having a photographing lens barrel which is movable in the optical axis direction of the camera.

2. Description of Related Art

A water-resistant camera which does not allow drips of rain or water to go into the camera e.g. in the rain or on the shore, and a waterproof camera which can take pictures even in shallow water, e.g. in a swimming pool, or in seawater near the edge of a beach, are both available on the market.

There have been attempts to develop a zoom camera which is waterproof and/or water resistant. One solution is to position a seal member, such as an O-ring, between a photographing lens barrel, which is movable to project from or retract into an opening formed in a front wall of a camera body, and the opening, so that the O-ring is brought into close contact with the inner periphery of the opening and the outer periphery of the photographing lens barrel at the outer surface and the inner surface of the O-ring respectively, thereby producing a watertight mechanism.

However, in order to enhance the watertightness between the O-ring and the inner periphery of the opening, it is necessary to minimize the clearance between the photographing lens barrel and the inner periphery of the opening so to firmly press the O-ring against the inner periphery of the opening. This causes the O-ring to also be strongly pressed against the outer periphery of the photographing lens barrel, resulting in an increase in the slide resistance of the movable photographing lens barrel. Therefore, no smooth movement of the photographing lens barrel can be ensured.

To avoid this, it is necessary to decrease the contact pressure of the O-ring against the inner periphery of the opening. This, however, decreases the watertightness between the O-ring and the inner periphery of the opening and between the O-ring and the outer periphery of the photographing lens barrel.

SUMMARY OF THE INVENTION

The primary object of the present invention is to provide a waterproof and/or water-resistant camera in which a stable watertight connection can be established between an opening formed in the camera body and a photographing lens barrel which is movable so as to project from or retract into the opening, while ensuring a smooth sliding movement of the photographing lens barrel, without using an O-ring which must be in close contact with the opening and the photographing lens barrel at a high pressure.

To achieve the object mentioned above, according to the present invention, there is provided a waterproof and/or water-resistant camera, comprising an opening which is formed in a camera body and in which a photographing lens barrel is movable in an optical axis direction, and an annular seal member which is positioned between the photographing lens barrel and the opening. The annular seal member is provided, on its outer periphery, with a secured portion which is to be secured to the opening in a watertight fashion and is provided, on its inner periphery, with an elastically deformable lip portion which comes into close contact with the outer periphery of the photographing lens barrel and which is deformable independent from the secured portion.

With this arrangement, since the secured portion of the annular seal member is secured to the opening a water-tight fashion and the lip portion of the annular seal member, which is deformable independently from the secured portion and is elastically brought into close contact with the outer periphery of the photographing lens barrel, the water tight connection is established between the opening and the photographing lens barrel without increasing the sliding resistance of the photographing lens.

According to another aspect of the present invention, the secured portion of the annular seal member is provided with a plurality of alternate outer and inner peripheral annular surfaces having different diameters. The opening of the camera body is provided with a plurality of inner and outer waterproof surfaces having different diameters which come into close contact with the corresponding outer and inner peripheral annular surfaces of the annular seal member due to an elastic deformation of the annular seal member.

According to the present invention, in other words, since the secured portion is secured to the opening in a watertight fashion and the inner lip portion is fitted in such a way that the lip portion elastically comes into close contact with the outer periphery of the photographing lens barrel without having a pressure due do the secured portion, a smooth slide movement of the photographing lens barrel can be ensured.

BRIEF DESCRIPTION OF DRAWINGS

The invention will be described below in detail with reference to the accompanying drawings, in which.

DESCRIPTION OF THE PREFERRED EMBODIMENTS

Figure 8:
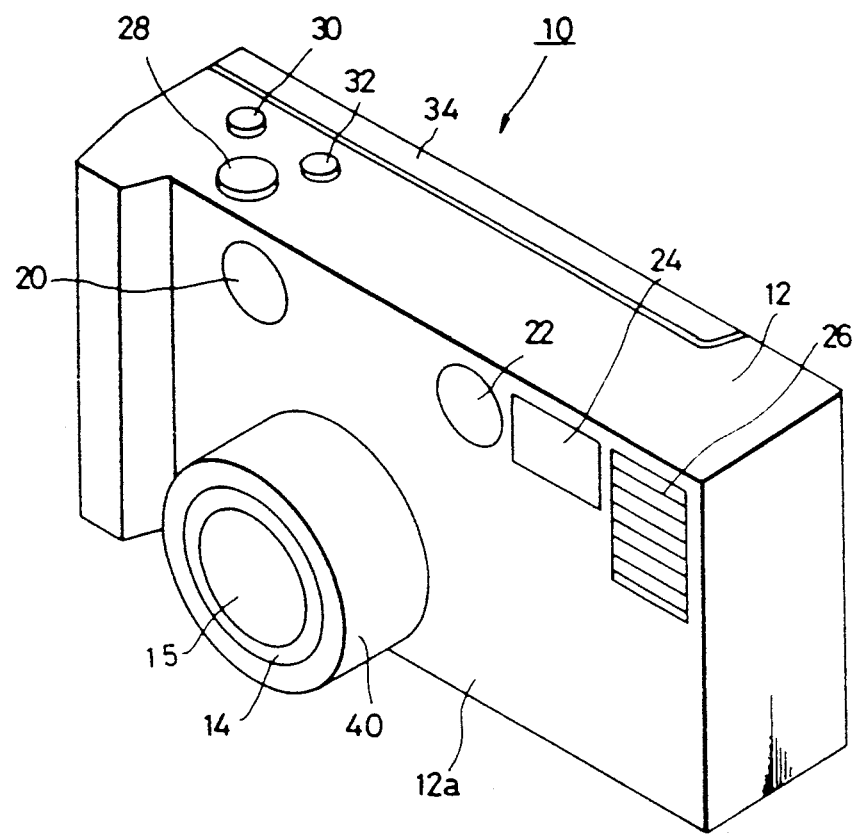

FIG. 8 shows an example of a waterproof and/or water-resistant camera 10 according to the present invention. The camera 10 has a water tight camera body 12 which has a photographing lens barrel 14 mounted to the camera body 12 in a watertight fashion. The photographing lens barrel 14 is movable in the optical axis direction of the camera by a pair of zoom switches 30 and 32 to effect the zooming operation. The photographing lens barrel 14 has a protection glass 15 provided on the front end thereof to protect the lens of the photographing lens barrel 14 in a watertight fashion.

The camera body 12 is provided on its upper face with a release button 28, and on its back with an openable back cover 34, respectively. On a front wall 12a of the camera body 12 are provided; a light emission window 20 through which infrared rays of light are emitted to detect the distance of an object, a light receiving window 22 which receives light reflected from an object to be photographed an objective window 24 of a finder, and a strobe light emitting window 26.

Figure 1:
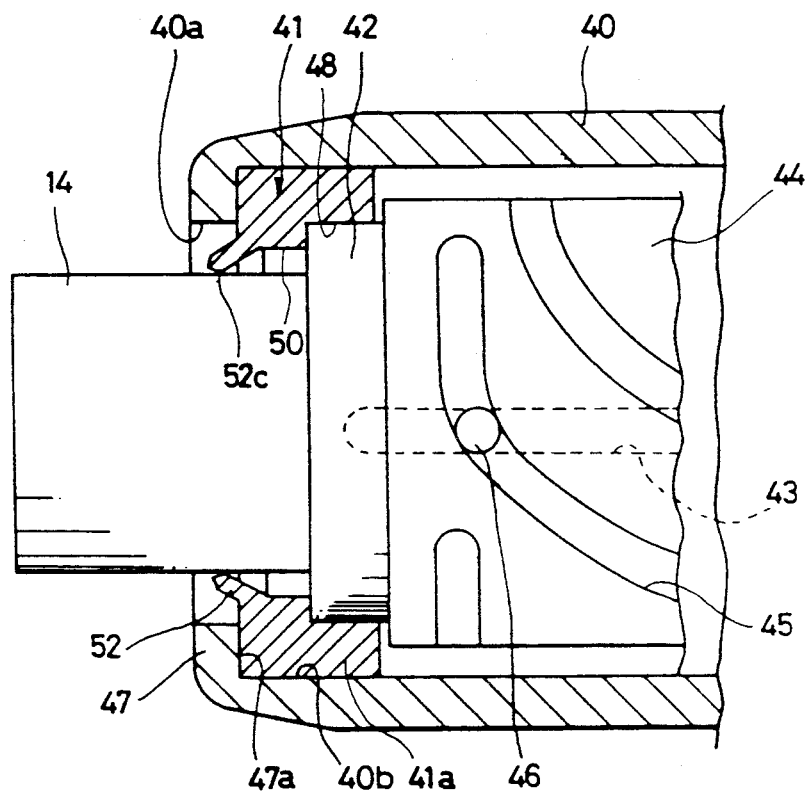
FIG. 1 is a side sectional view of a main part of a water-resistant and waterproof camera according to a first embodiment of the present invention.

As can be seen in FIG. 1, a stationary ring 42 which is secured to the camera body 12 is provided in a stationary barrel 40. The stationary ring 42 is provided, on its peripheral surface with a linear movement guide groove 43 which extends in a direction parallel with the optical axis direction. A cam ring 44 is rotatably fitted on the stationary ring 42. The cam ring 44 is provided, on its outer periphery, with a cam groove 45. The photographing lens barrel 14 is movably fitted in the stationary ring 42. The photographing lens barrel 14 has a roller 46 which radially projects therefrom and which is fitted in both the linear movement guide groove 43 and the cam groove 45. Consequently, when the cam ring 44 is rotated by a zoom motor (not shown), the roller 46 moves along the cam grooves 43 and 45 causing the photographing lens barrel 14 to move in the optical axis direction.

The front end of the stationary barrel 40 is bent inwardly to form an inwardly extending flange 47 which defines a center opening 40a, which together with inner surface 40b of the stationary barrel 40 provides the surfaces on which the photographing lens barrel 14 moves. An annular water-seal member (water-tight member) 41 is arranged in a space defined by the center opening 40a, the inner surface 40b of the stationary barrel 40 and the photographing lens 14.

Figure 2:
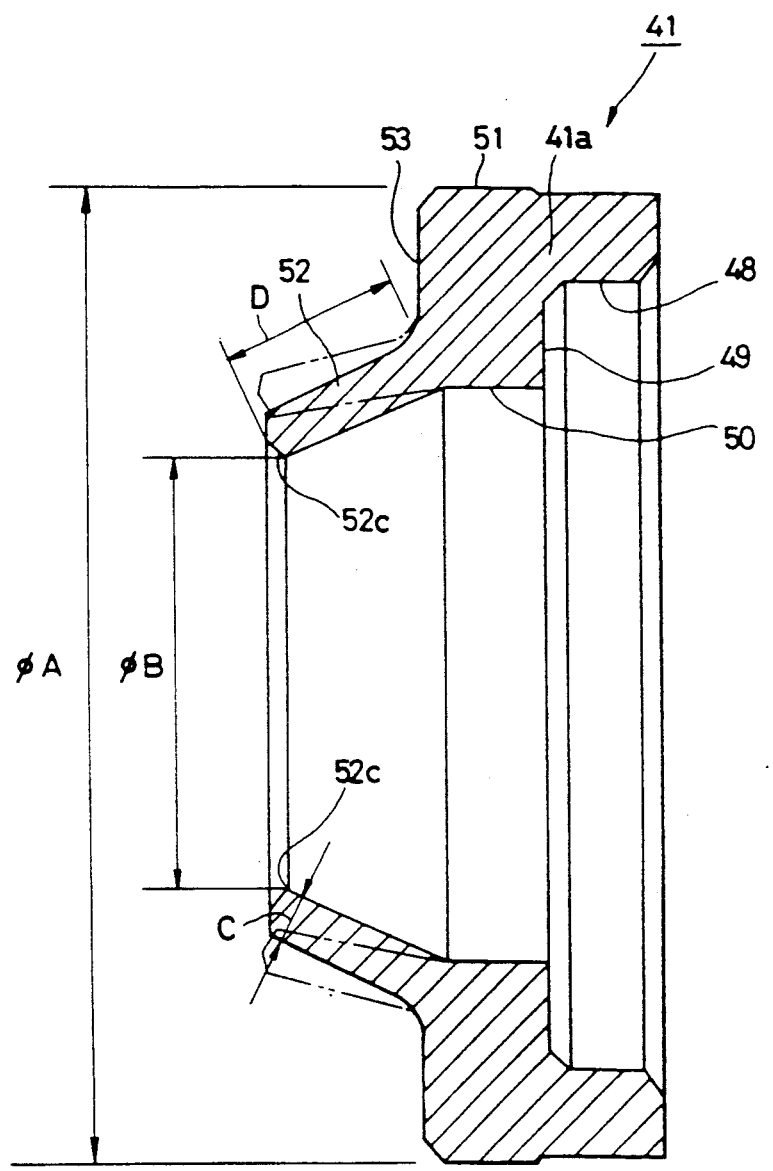
FIG. 2 is a side sectional view of an annular water seal member shown in FIG. 1.
Figure 3:
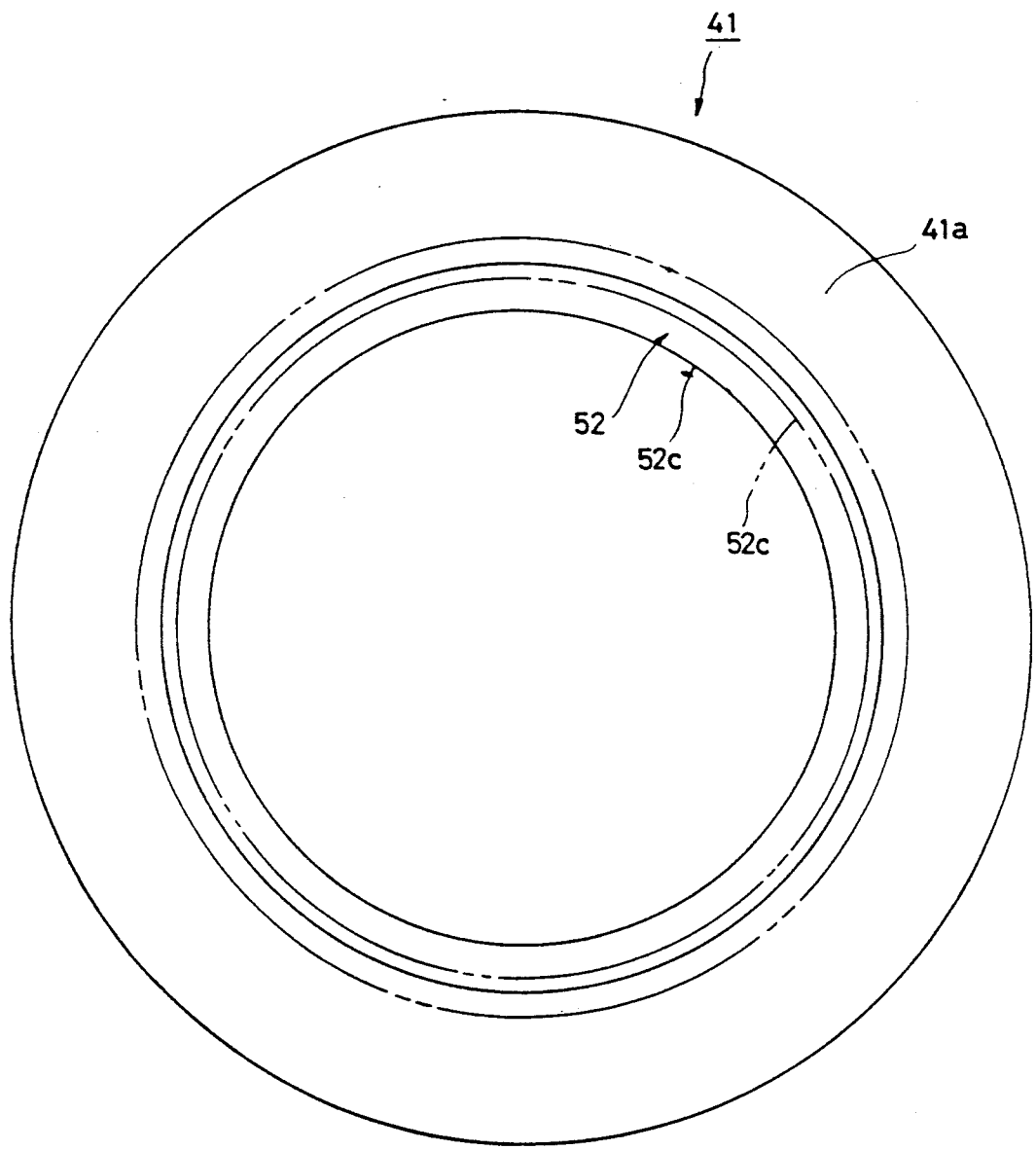
FIG. 3 is a front elevational view of FIG. 2.

FIGS. 2 and 3 show a sectional view and a front elevational view of the annular water-seal member 41, respectively.

The annular water-seal member 41 has an outer annular secured portion 41a which is to be secured to the openings 40a and 40b in a watertight fashion, and an inner, annular lip portion 52 having a center opening 52c which comes into contact with outer periphery of the photographing lens barrel 14. The secured portion 41a is formed by an outer peripheral surface 51 which comes into close contact with the opening (the inner watertight surface) 40b of the stationary lens barrel 40, a stepped inner surface 48 which is formed at the rear end (right end in FIGS. 1 and 2) of the seal member 41 in which the stationary ring 42 is fitted, and an abutment wall 53 which bears against the rear surface 47a of the stationary barrel 40 causing the secured portion 41a to be secured to the opening 40a and 40b of the stationary barrel 40 in a watertight fashion. The outer surface 51 of the seal member 41 has a slightly larger diameter than the inner diameter of the inner surface 40b, in a free state of the seal member 41, and the inner surface portion 48 has a diameter identical to the outer diameter of the stationary ring 42. The inner surface portion 50 has a diameter larger than the outer diameter of the photographing lens barrel 14 so that the photographing lens barrel 14 never contacts the inner surface portion 50. The front thin lip portion 52 projects forwardly from the secured portion 41a as viewed from the camera body 12. It should be noted that the lip portion 52 is deformable substantially independent from the secured portion 41a. The inner surface portion 48 is connected to the inner surface portion 50 by a stepped portion (vertical surface portion) 49 which bears against the front end of the stationary ring 42 to restrict the backward displacement of the seal member 41 when the latter is fitted on the stationary ring 42. The abutment wall 53 bears against the rear surface 47a of the stationary barrel 40 and restricts the forward displacement of the seal member 41. It should be noted that there is no necessity to press the annular seal member 41 in the optical axis direction, by and between the annular flange 47 and the stationary ring 42, since the watertight mechanism can be ensured by the secured portion 41a as mentioned above. It should also be noted, however, the present invention can be applied even when the annular seal member 41 is pressed in the optical axis direction by and between the annular flange 47 and the stationary ring 42.

The outer surface 51 of the seal member 41 has a diameter $\phi A$ which is slightly larger than the diameter of the inner surface 40b of the stationary barrel 40, in a free state of the annular seal member 41. Preferably, the seal member 41 is made of urethane rubber having a rubber hardness of 60~100 Hs. For example, when the diameter of the inner surface 40b of the stationary barrel 40 is 43.75~43.85 mm, $\phi A$ is preferably 4.20~45.00 mm. In this example, since the outer diameter $\phi A$ of the seal member 41 is reduced by 0.45~1.15 mm, when it is fitted in the stationary barrel 40 shown in FIG. 1, the outer surface 51 of the seal member 41 is brought into close contact with the inner surface 40b of the stationary barrel 40 in watertight fashion, due to the elasticity of the seal member 41, thus ensuring watertightness between the opening 40a and 40b of the stationary barrel 40 and the secured portion 41a of the seal member 41.

On the other hand, the lip portion 52 of the seal member 41 has an inner diameter $\phi B$, which is smaller than an outer diameter of the photographing lens barrel 14 when the seal member 41 is assembled in the stationary lens barrel 40. The elastic deformation of the lip portion 52 when the photographing lens barrel 14 is inserted therein is set, for example, at a radius of 0.2~1.0 mm. It should be noted that the inner diameter $\phi B$ of the seal member 41 may be reduced when the seal member 41 is assembled in the stationary barrel 40. However, the deformation of the lip portion 52 occurs without causing a deformation of the secured portion 41a when assembled. Specifically, the lip portion 52 deforms independently of the secured portion 41a. Therefore, it is possible to ensure the watertight effects between the lip portion 52 of the seal member 41 and the photographing lens barrel 14 without increasing the sliding resistance of the photographing lens barrel 14, thus resulting in a smooth movement thereof.

When the outer diameter $\phi A$ of the seal member 41 is 44.20~45.00 mm, and the inner diameter $\phi B$ of the lip portion 52 is 36.3~36.9 mm, the thickness C and the length D of the lip portion 52 are preferably 0.5~1.0 mm and 1.5~5.0 mm, respectively. The thickness of the lip portion 52 is determined so that no buckling occurs during the sliding movement of the photographing lens barrel 14. The length D of the lip portion 52 is long enough to prevent an elastic deformation reversing the direction thereof, which may be caused by changing of the direction of the sliding movement of the photographing lens barrel 14.

When the photographing lens barrel 14 is fitted in the seal member 41, the lip portion 52 is elastically deformed so to outwardly expand substantially independent from the secured portion 41a, as shown by an imaginary line in FIGS. 2 and 3. The fastening force and the water tightness of the lip portion 52 depend on the rubber hardness and the thickness of the lip portion 52, and the difference in diameter between the inner diameter of the lip portion 52 and the outer diameter of the photographing lens barrel 14 etc. Furthermore, the sliding resistance of the photographing lens barrel 14 depends on the fastening force of the lip portion 52 and the frictional coefficient of the outer peripheral surface of the photographing lens barrel 14 to the lip portion 52. This can be optionally selected by changing the frictional coefficient, for example, by painting the outer peripheral surface of the photographing lens barrel 14 or the lip portion 52, or by changing the material of which the lip portion 52 or the photographing lens barrel 14 is made.

Due to the close contact of the lip portion 52 with the outer peripheral portion of the photographing lens barrel 14, a possible frost which may stick to the outer peripheral surface of the photographing lens barrel 14 in cold weather which can be removed or scraped during the slide movement of the photographing lens barrel 14. As a result of the lip portion 52 projecting forwardly in the optical axis direction, the lip portion 52a is pressed against the outer peripheral surface of the photographing lens barrel 14, when the camera is used in the water, due to water pressure acting thereon, thus enhancing the watertightness.

Figure 4:
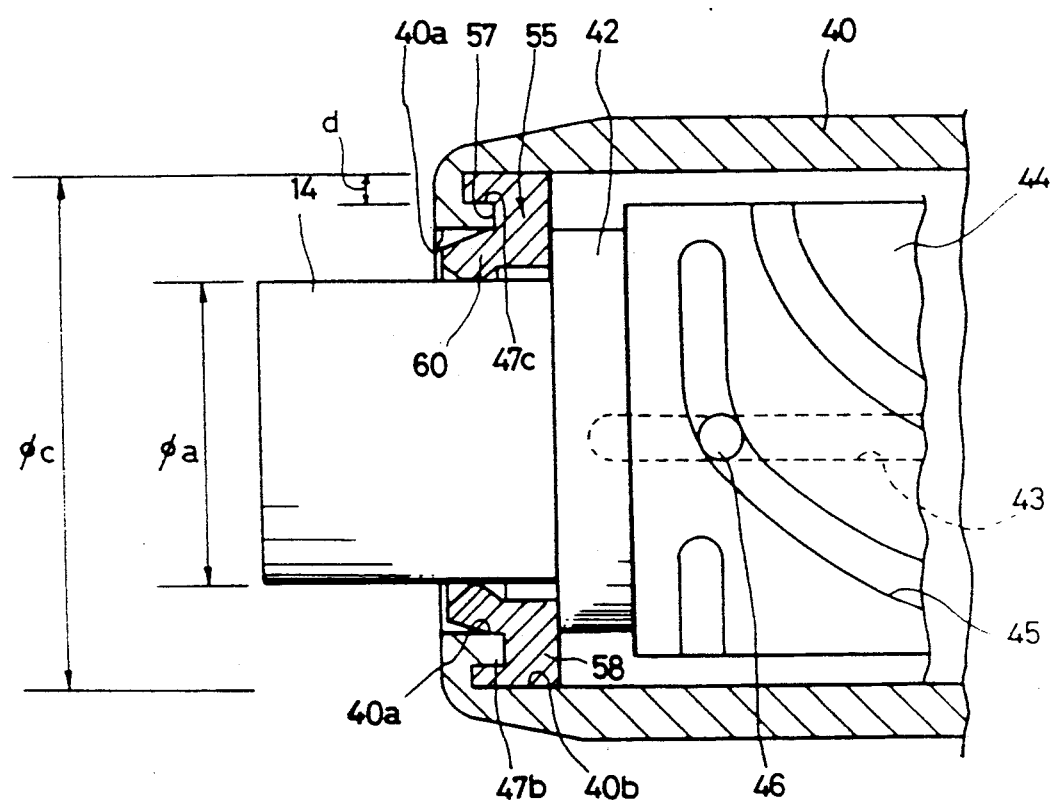
FIG. 4 is a side sectional view of a main part of a water-resistant and waterproof camera according to a second embodiment of the present invention.
Figure 5:
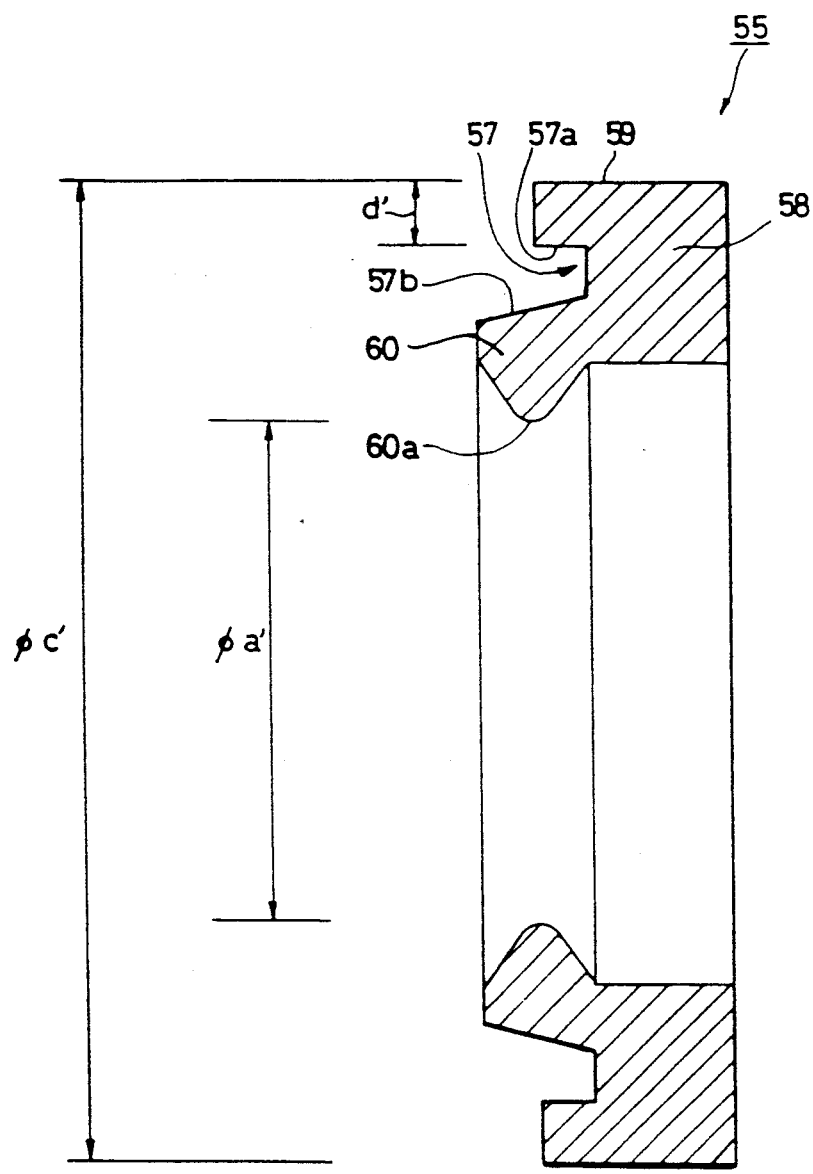
FIG. 5 is a side sectional view of an annular water seal member shown in FIG. 4.

FIGS. 4 and 5 show a second embodiment of the present invention in which the elements corresponding to those in the first embodiment illustrated in FIGS. 1, 2 and 3 are designated with the same reference numerals as those in FIGS. 1, 2 and 3.

The stationary barrel 40 has an opening 40a at the front end thereof and a rearward extending bent portion 47b which defines the opening 40a. In the bent portion 47b of the stationary barrel 40 is fitted an annular waterseal member 55 which has an inner, annular lip portion 60 and an outer annular secured portion 58. The inner annular lip portion 60 is deformable independently from the annular secured portion. An inner contact portion 60a of the lip portion 60 has a diameter slightly smaller than the outer diameter of the photographing lens barrel 14. On the front end of the secured portion 58 is formed an annular recess 57 in which the bent portion 47b of the stationary barrel 40 is fitted. The secured portion 58 of the seal member 55 has an outer surface portion 59 which comes into close contact with the opening (the inner surface portion) 40b of the stationary barrel 40 in a watertight fashion. The recess 57 is defined by an inner annular surface portion 57a which comes into close contact with a corresponding outer contact surface 47c of the bent portion 47b of the stationary barrel 40 in a watertight fashion. An outer annular surface portion 57b is inclined to the inner annular surface portion 57a and is apart from the corresponding inner surface 40a of the bent portion 47b so as to ensure the deformation of the lip portion 60 independently of the secured portion 58.

The relationships between the outer diameter $\phi a$ of the photographing lens barrel 14, the diameter $\phi c$ of the inner contact surface 40b of the stationary barrel 40, the difference d in diameter between the outer contact surface 47c of the bent portion 47b and the inner contact surface 40b of the stationary barrel 40, the diameter $\phi a'$ of the front inner close contact portion 60 of the seal member 55, the diameter $\phi c'$ of the outer surface portion 59 of the seal member 55, and the difference d' in diameter between the diameter $\phi c'$ of the outer surface portion 59 and the diameter of the inner annular surface portion 57a are as follows:

$$\phi a > \phi a', \ \phi c < \phi c', \ d \leq d'.$$

Accordingly, when the seal member 55 is fitted in the stationary barrel 40 so that the bent portion 47b is fitted in the recess 57, the inner contact surface 40b of the stationary barrel 40 comes into close contact with the outer surface portion 59 of the seal member 55 in a water-tight fashion, and the inner annular surface portion 57a comes into close contact with the outer contact surface 47c in a watertight fashion, respectively. Thus, the secured portion 58 is secured to the openings 40a and 40b in a watertight fashion.

Since the secured portion 58 of the seal member 55 is attached to the opening 40a of the stationary barrel 40 in a watertight fashion, regardless of the attachment of the photographing lens barrel 14 thereto, the photographing lens barrel 14 can be inserted in the lip portion 60 of the seal member 55 with a small insertion force, and with a small frictional resistance for ensuring the watertightness therebetween.

The watertight connection will be automatically established between the seal member 55 and the photographing lens barrel 14 when the seal member is fitted onto the photographing lens barrel.

The small frictional resistance between the photographing lens barrel 14 and the seal member 55 contributes to the smooth sliding movement of the photographing lens barrel in the seal member.

Figure 6:
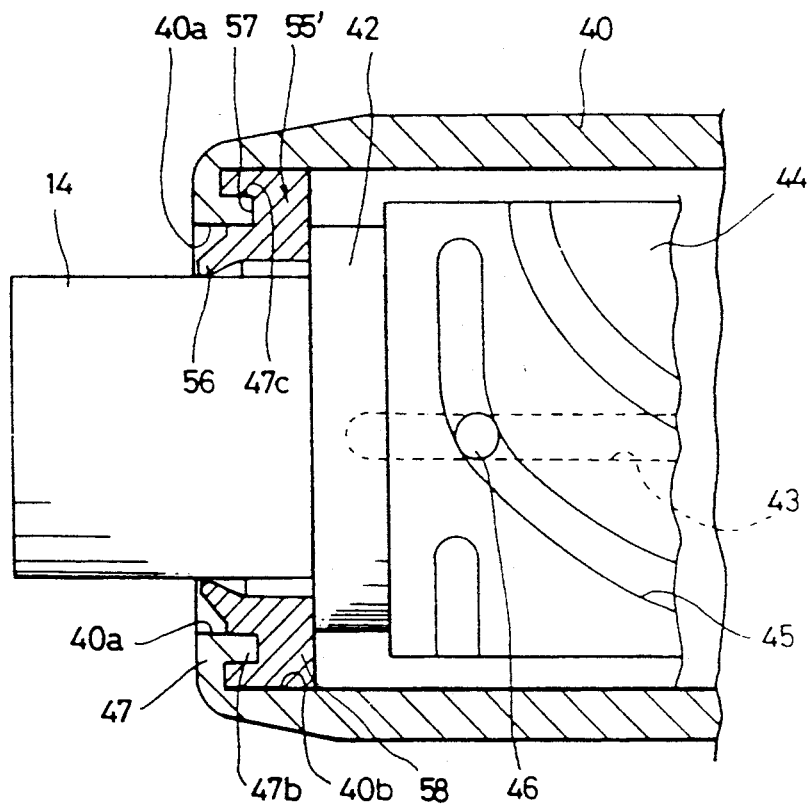
FIG. 6 is a side sectional view of a main part of a water-resistant and waterproof camera according to a third embodiment of the present invention.
Figure 7:
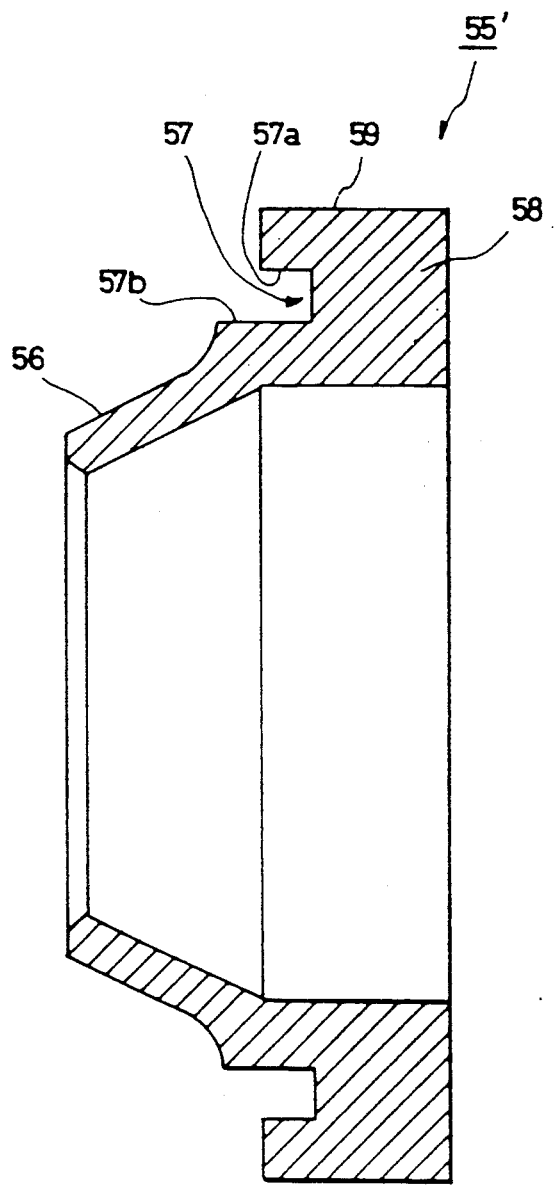
FIG. 7 is a side sectional view of an annular water seal member shown in FIG. 6; and, FIG. 8 is a perspective view of a waterproof and water-resistant camera to which the present invention is applied.

FIGS. 6 and 7 show a third embodiment of the present invention in which the annular water seal member 55' has both the lip portion 56, of the first embodiment illustrated in FIGS. 1 and 2, and the secured portion 58, having the annular recess 57 of the second embodiment, illustrated in FIGS. 4 and 5.

With the arrangement shown in FIGS. 6 and 7, since the lip portion 56 is deformable independently from the secured portion 58 similar to the first and second embodiments, similar positive watertight effects can be ensured.

What is claimed is:

1. A waterproof and/or water-resistant camera, comprising:
    an opening in a camera body in which a photographing lens barrel is movable in an optical axis direction; and
    an annular seal member which is positioned between said photographing lens barrel and said opening,
    wherein said annular seal member is provided, on an outer periphery, with a secured portion to be secured to an inner periphery of said opening and is provided, on an inner periphery, with a lip portion which elastically comes into close contact with an outer periphery of said photographing lens barrel, and which is elastically deformable independently from said secured portion, said lip portion projecting forwardly in the optical axis direction as viewed from said camera body.

2. A waterproof and/or water-resistant camera according to claim 1, wherein said lip portion is structured and arranged so that when said photographing lens barrels is fitted in said lip portion, said lip portion is elastically deformed at a front end thereof, in a radial direction.

3. A waterproof and/or water-resistant camera according to claim 1, wherein said annular seal member is made of urethane rubber.

4. A waterproof and/or water-resistant camera according to claim 3, wherein said urethane rubber has a rubber hardness of 60~100 Hs.

5. A waterproof and/or water-resistant camera according to claim 1, further comprising a stationary barrel in which said opening is formed.

6. A waterproof and/or water-resistant camera according to claim 5, wherein said stationary barrel has therein a stationary ring coaxial to said photographing lens barrel, and said stationary ring restricts a rearward displacement of said annular seal member in the optical axis direction.

7. A waterproof and/or water-resistant camera according to claim 5, wherein said stationary barrel has an inner annular flange forming a part of said opening, and said annular annular flange restricts a forward displacement of said annular seal member in the optical axis direction.

8. A waterproof and/or water-resistant camera according to claim 5, wherein an outer diameter of said photographing lens barrel is larger than an inner diameter of said lip portion of said annular seal member.

9. A waterproof and/or water-resistant camera according to claim 5, wherein an outer diameter of said secured portion of said annular seal member is larger than an inner diameter of said stationary barrel.

10. A waterproof and/or water-resistant camera, comprising:

an opening which is formed in a camera body, and in which a photographing lens barrel is movable in an optical axis direction;

an elastically deformable annular seal member which is positioned between said photographing lens barrel and said opening, and which has a plurality of alternate outer and inner peripheral annular surfaces having different diameters; and said opening including a plurality of inner and outer waterproof surfaces having different diameters and coming into close contact with corresponding said outer and inner peripheral annular surfaces of said annular seal member due to an elastic deformation of said elastically deformable annular seal member.

11. A waterproof and/or water-resistant camera according to claim 10, wherein said annular seal member is provided on said inner peripheral surface with a lip portion which comes into close contact with an outer peripheral surface of said photographing lens barrel when said photographing lens barrel is inserted in said annular seal member, and which is deformable independently from said alternate outer and inner peripheral annular surfaces.

12. A waterproof and/or water-resistant camera according to claim 10, further comprising a stationary barrel in which said opening is formed.

13. A waterproof and/or water-resistant camera according to claim 12, wherein said stationary barrel has therein a stationary ring coaxial to said photographing lens barrel, and said stationary ring restricts the rearward displacement of said annular seal member in the optical axis direction.

14. A waterproof and/or water-resistant camera according to claim 12, wherein said stationary barrel has an inner annular flange forming a part of said opening, and said annular flange restricts the forward displacement of said annular seal member in the optical axis direction.

* * * * *

UNITED STATES PATENT AND TRADEMARK OFFICE
CERTIFICATE OF CORRECTION

PATENT NO. : 5,066,965

DATED : November 19, 1991

INVENTOR(S) : Hitoshi TANAKA et al.

It is certified that error appears in the above-indentified patent and that said Letters Patent is hereby corrected as shown below:

On cover page, at section [57], line 8 under Abstract, change "provide" to ---provided---.
    At column 7, line 25 (claim 7, line 4), delete "annular" (first occurrence).

Signed and Sealed this

Thirteenth Day of June, 1995

Attest:

BRUCE LEHMAN

*Attesting Officer*  *Commissioner of Patents and Trademarks*